United States Patent [19]

Conway

[11] Patent Number: 5,666,181
[45] Date of Patent: Sep. 9, 1997

[54] SPRING TEMPLE FOR EYEWEAR

[75] Inventor: Simon M. Conway, Lima, N.Y.

[73] Assignee: Bausch & Lomb Incorporated, Rochester, N.Y.

[21] Appl. No.: 631,769

[22] Filed: Apr. 10, 1996

[51] Int. Cl.$^6$ .............................. G02C 5/16; G02C 5/14
[52] U.S. Cl. .............................. 351/113; 351/111; 351/119
[58] Field of Search ................................ 351/119, 118, 351/111, 113, 115, 114, 121, 158, 41

[56] References Cited

U.S. PATENT DOCUMENTS

| | | |
|---|---|---|
| 1,572,733 | 2/1926 | McCourt . |
| 1,599,843 | 9/1926 | Schumacher . |
| 1,743,796 | 1/1930 | Nelson . |
| 1,747,843 | 2/1930 | Ritholz . |
| 1,979,855 | 11/1934 | Belgard ........................ 88/52 |
| 2,012,759 | 8/1935 | Hefner ......................... 88/52 |
| 2,746,087 | 5/1956 | Dolezal ........................ 18/48 |
| 3,516,737 | 6/1970 | Banfi ........................... 351/114 |
| 3,531,190 | 9/1970 | Leblanc ....................... 351/113 |
| 3,923,384 | 12/1975 | Leblanc ....................... 351/113 |
| 4,618,226 | 10/1986 | Sartor ......................... 351/111 |
| 4,848,891 | 7/1989 | Lee ............................. 351/113 |
| 4,983,029 | 1/1991 | Sato ............................ 351/41 |
| 4,995,713 | 2/1991 | Curto .......................... 351/113 |

FOREIGN PATENT DOCUMENTS

| | | |
|---|---|---|
| 1185072 | 7/1959 | France . |
| 1453932 | 8/1966 | France . |

*Primary Examiner*—Hung X. Dang
*Attorney, Agent, or Firm*—Katherine McGuire

[57] ABSTRACT

A spring-action temple having two main front and rear temple segments. The front temple segment attaches to the eyewear front at a front end thereof and forms includes a leaf spring at the rear end thereof. The rear temple segment includes an opening at the front end thereof which forms a channel which telescopingly receives the leaf spring of the front temple segment. The front and rear temple segments pivotally attach to each other at a point adjacent the opening of the channel such that the rear temple segment may pivot further outwardly, thereby biasing the leaf spring within the channel to accommodate a larger head size while providing a secure yet comfortable fit.

21 Claims, 2 Drawing Sheets

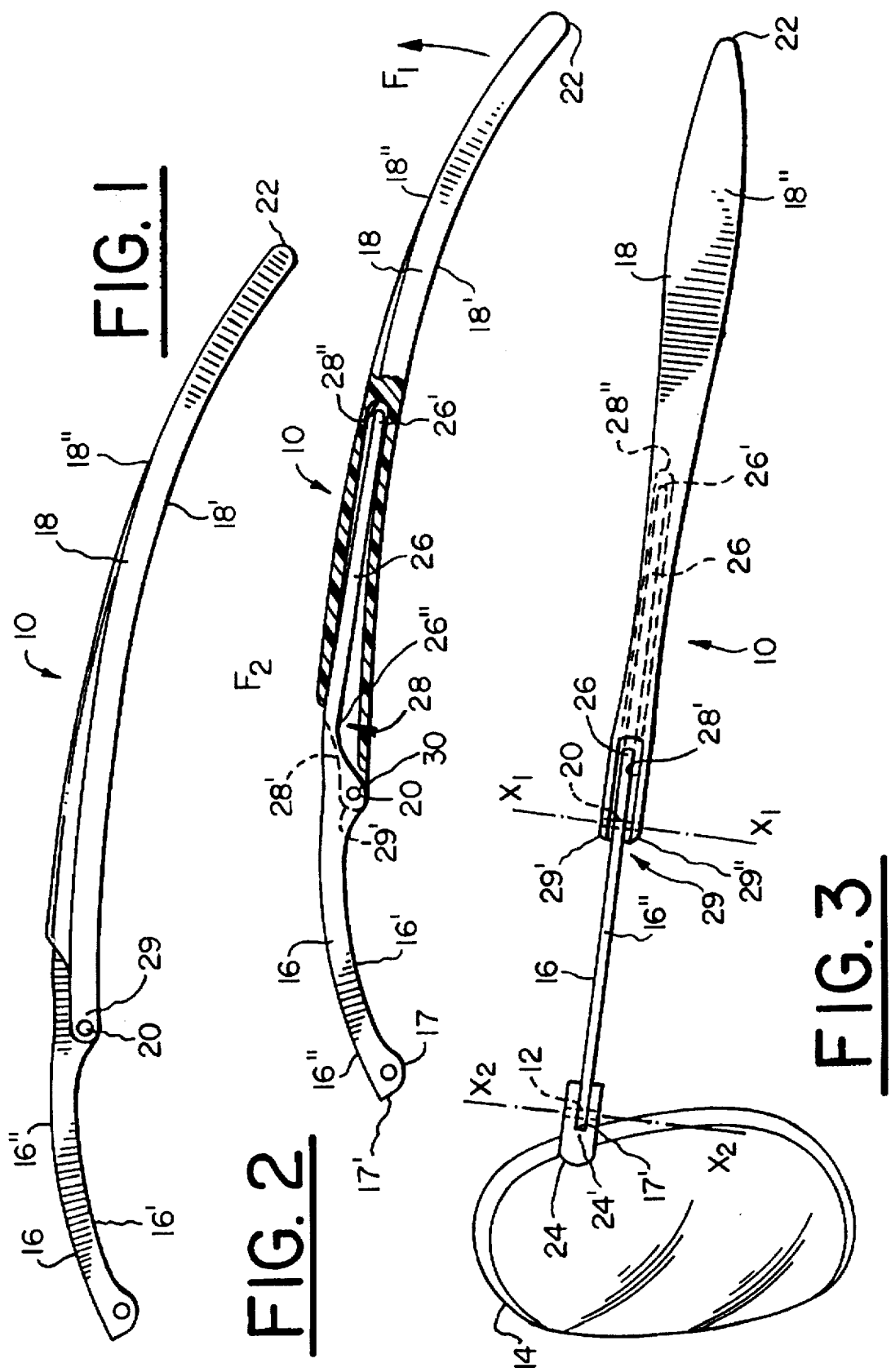

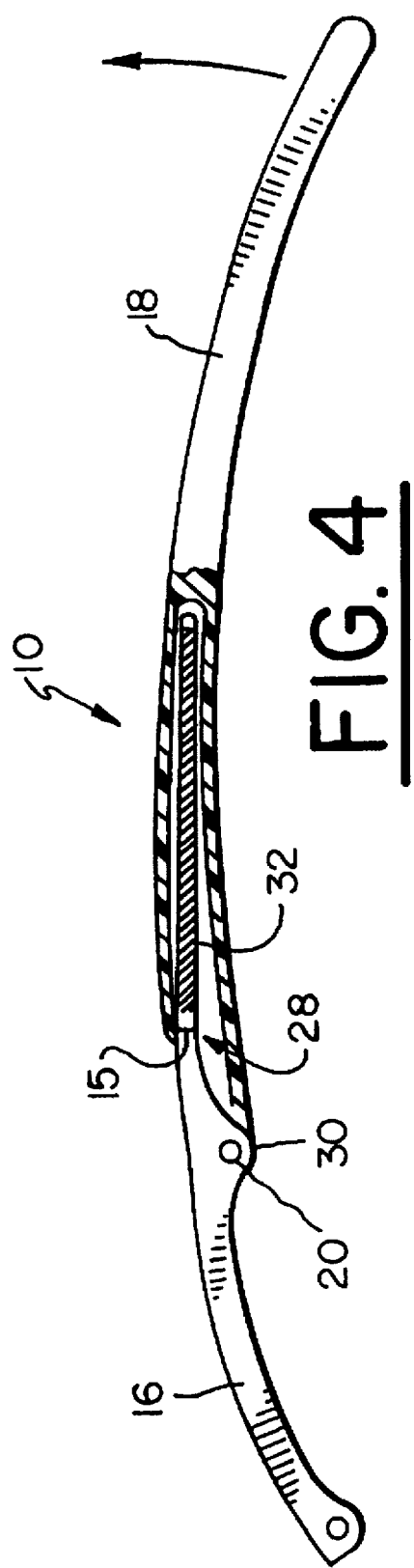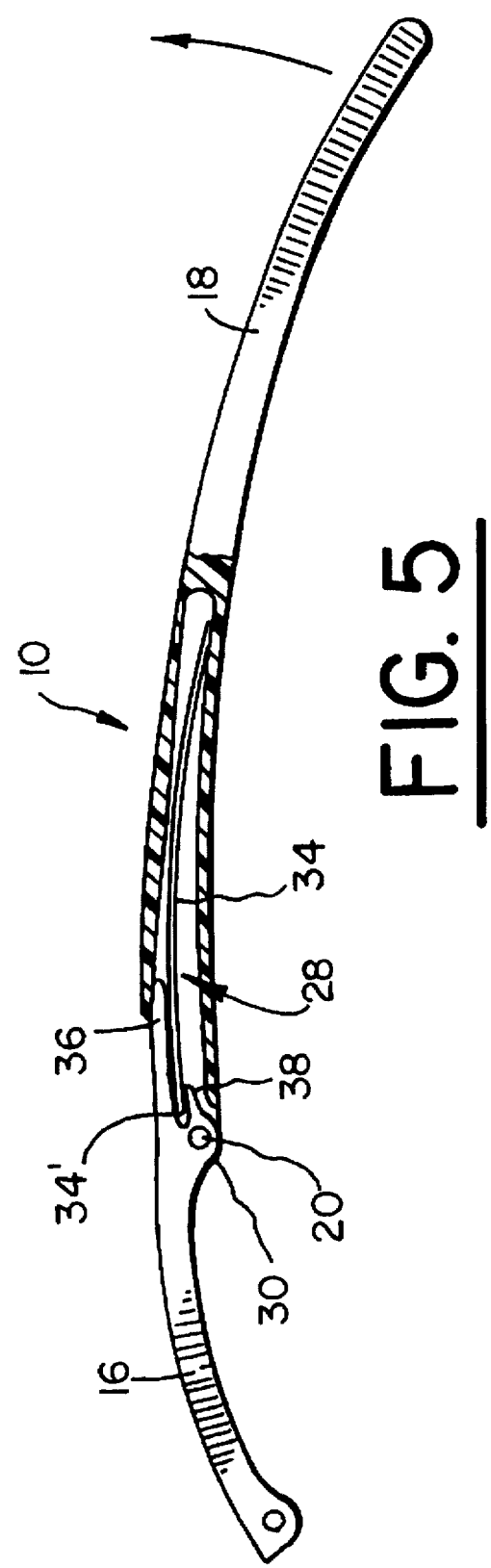

SPRING TEMPLE FOR EYEWEAR

BACKGROUND OF THE INVENTION

The present invention relates to eyewear temples, and more particularly relates to an improved spring-action eyewear temple which automatically flexes in the fully open position to comfortably self-adjust to a wide variety of head sizes.

Eyewear temples are elongated members which are typically mounted at a first end thereof via a hinge assembly to opposite ends of the eyewear front frame which includes the lenses. The temples pivot about their hinge connections from a fully open position where the temples extend about 90° relative to the front frame, to a fully closed position where the temples fold one against the other approximately parallel to the rear of the front frame. When in the fully open position, the temples extend rearwardly along either side of the head with the free ends of the temples engaging the head above (and sometimes behind) the ears to secure the eyewear on the head of the wearer. In eyewear having only a conventional hinge attaching the temples to the frame, the distance between the free ends of the temples when both are fully open is invariably set. Since individual head sizes vary, the eyewear temples may not securely fit the eyewear on some head sizes, and an individual may therefore require the temples to be adjusted (e.g., by forcibly and permanently bending the temple) to ensure an adequate and comfortable fit on the head.

It is known to incorporate a spring mechanism into the eyewear assembly so as to provide a limited degree of adjustability to the temple when in the fully open position. As such, upon placing the eyewear on the head, the temples may automatically move in either pivotal direction from the unbiased, fully open position to self-adjust to the head size of the wearer in a manner ensuring a snug yet comfortable fit. Some examples of eyewear assemblies incorporating such a spring mechanism at the temple may be seen in the following patents:

U.S. Pat. No. 1,572,733 issued to MeCourt on Feb. 9, 1926

U.S. Pat. No. 1,599,843 issued to Schumaeher on Sep. 14, 1926

U.S. Pat. No. 3,531,190 issued to LeBlanc on Sep. 29, 1970

U.S. Pat. No. 3,923,384 issued to LeBlanc on Dec. 2, 1975

U.S. Pat. No. 4,618,226 issued to Sartor et al on Oct. 21, 1986

U.S. Pat. No. 4,995,713 issued to Curto et al on Feb. 26, 1991

In each of the above references, the spring is a separate element of a multi-component temple and hinge assembly. Also, in most of the assemblies, part or all of the spring element is visually noticeable which detracts from the overall ornamental appearance of the eyewear.

SUMMARY OF THE INVENTION

The present invention provides a self-adjusting temple for eyewear to accommodate a variety of head sizes which comprises a minimum of parts and is aesthetically and economically attractive. The temple is divided into two main segments, the first of which is regarded as the front segment and is pivotally attached at the front end thereof to a lateral end of the front frame. The second segment of the temple is regarded as the rear segment and has a front end which pivotally connects to the front segment, and a rear end which engages the side of the wearer's head when the eyewear is placed on the head. The rear half of the front segment includes a leaf spring which is inserted into and extends within an elongated, arcuate channel formed in the front end of the rear segment. The front and rear segments pivotally connect to each other at a location adjacent the perimeter of the opening of the rear segment which lies approximately adjacent the temple area of the wearer's head when the eyewear is worn.

The temple of the invention may therefore pivot to a limited degree beyond the unbiased, fully open position to accommodate a larger head size by the leaf spring portion of the front segment which can flex and tension within the channel of the rear segment, biasing the rear segment of the temple in a direction toward the head. The distance the spring portion may flex is limited by the elongated channel in the rear segment against which the spring will abut which sets the full extent of adjustable movement of the temple.

BRIEF DESCRIPTION OF THE DRAWINGS

FIG. 1 is a top plan view of an eyewear temple according to the present invention;

FIG. 2 is the view of FIG. 1 partly in section to reveal the spring portion of the temple;

FIG. 3 is a side, elevational view of the temple of FIGS. 1 and 2 attached to a front frame of an eyewear as viewed from the outside of the eyewear;

FIG. 4 is a side, elevational view of a second embodiment of the temple; and

FIG. 5 is a side, elevational view of a third embodiment of the temple.

DETAILED DESCRIPTION

Referring to the drawings, an eyewear temple 10 is provided for pivotal attachment via a hinge pin 12 to an eyewear front frame 14 (FIG. 3). Temple 10 is comprised of two main front and rear segments 16 and 18, respectively, which are pivotally connected to each other via hinge pin 20 such that front and rear segments 16 and 18 may pivot to a limited degree with respect to each other about pivot axis $X_1$—$X_1$ which extends in a generally vertical plane when the eyewear is worn, substantially parallel to the axis $X_2$—$X_2$ of hinge pin 12. Each segment 16 and 18 has an inside and outside surface 16', 16" and 18', 18", respectively, where the inside surfaces 16' and 18' face the wearer's head, and the outside surfaces 16" and 18" face away from the wearer's head when the eyewear is worn. Both segments 16 and 18 are elongated and slightly arcuate shaped members, with front segment 16 being preferably formed of a metal or metal alloy (e.g., phosphor bronze), and rear segment 18 being made of a plastic material (e.g., nylon). When the eyewear is placed on the head, the rear length of rear segment 18 which includes terminal end 22 will extend above the ear with the inside surface 18' thereof making frictional contact with the wearer's head and thereby securing the eyewear on the head.

The outward pivotal movement of temple 10 about the hinge axis $X_2$—$X_2$, which attaches the front end 17 to the eyewear front 14, is limited by the front surface 17' thereof abutting the slotted surface 24' of connecting member 24 in the fully open condition of temple member 10. As such, the distance between both temples of an eyewear in the fully open condition is usually fixed in a conventional eyewear having only this one hinge connection, thereby requiring some additional effort (e.g., by permanently bending the temple) to ensure a secure and comfortable fit of the eyewear on the head. The instant invention needs no such additional effort in that it allows the temple to pivot beyond the full extent of the pivot of the temple solely at axis $X_2$—$X_2$, in the manner particularly described below, thereby providing a temple which automatically and comfortably adjusts to accommodate a variety of head sizes.

More particularly, in a first embodiment of the invention shown in FIGS. 1–3, the rear length of front temple segment 16 forms an integral leaf spring 26 having a terminal end 26' which is directed into and extends within an elongated channel 28 formed in the front length of rear segment 18. The perimeter of the mouth 28' of channel 28 extends in an oblique plane such that the inside surface 18'of rear segment 18 is longer than the outside surface 18", forming a forward-most end portion 29 located adjacent inside surface 18' opposite terminal end 22. End portion 29 is bifurcated into first and second, parallel prongs 29' and 29" such that the protruding portion 30 located on the inside surface 16' of front segment 16 (at the juncture of leaf spring 26 and the front length of segment 16) extends therebetween with pivot pin 20 extending consecutively through prong 29', protruding portion 30, and prong 29".

The diameter of channel 28 is larger at the mouth 28' thereof, tapering gradually inwardly towards terminal end 22 to the bottom 28" of the channel 28 which is located approximately at the center of rear segment 18. The Figures illustrate the unbiased, "at-rest" state of temple 10, where the outside surface 16" of leaf spring portion 26 lies adjacent outside surface 18" of rear segment 18, abutting portion 18" adjacent the perimeter 28' of channel 28. Upon a force $F_1$ acting in the direction of the arrow near terminal end 22, a reactant force $F_2$ will be created at portion 18" adjacent perimeter 28' causing leaf spring 26 to flex within channel 28. This allows rear temple portion 18 to pivot about pin 20 further outwardly in the direction of the $F_1$ arrow, thereby accommodating a larger head size. Also, as rear temple portion 18 pivots outwardly, leaf spring 26 biases it in the opposite direction toward the wearer's head to ensure a snug yet comfortable fit. The distance rear temple portion 18 may pivot about pin 20 is limited by inner spring surface 26" abutting the wall of channel 28 located adjacent inner surface 18' of rear temple portion 18 as rear temple portion 18 reaches its full outward pivotal movement.

In a second embodiment of the invention seen in FIG. 4, leaf spring 32 is formed of a spring cable which colinearly attaches directly to the rear end portion 15 of front temple segment 16. In a third embodiment shown in FIG. 5, the rear end portion of front temple segment 16 is configured with parallel finger portions 36 and 38 between which an end 34' of a leaf spring 34 is secured.

It will thus be appreciated the present invention provides a spring-action temple which is comprised of a minimum of parts yet is effective at accommodating eyewear to a variety of head sizes. Further, the present invention provides a spring-action temple which is very stream-lined in appearance and thereby fits well within today's highly competitive eyewear styles.

What is claimed is:

1. A temple for an eyewear having a front frame, said temple comprising:

a) an elongated rear temple segment having opposite front and rear ends, said rear temple segment front end including an elongated, internal channel extending for a predetermined distance within said rear temple segment, said elongated, internal channel being defined by an inner channel wall;

b) an elongated front temple segment having opposite front and rear ends, said front temple segment front end being pivotally connected to said eyewear front frame and thereby defining a first pivot axis, said front end of said rear temple segment being pivotally connected to said rear end of said front temple segment and thereby defining a second pivot axis spaced rearwardly of said first pivot axis along said temple, said front and rear temple segments being movable together as a single unit about said first pivot axis between a closed position approximately parallel to said eyewear front frame, and a normally open position approximately perpendicular to said front frame; and c) an elongated spring having opposite first and second ends, said spring first end attached to and extending from said front temple segment rear end, said spring second end extending within said elongated channel of said rear temple segment, whereby said temple may be pushed further outwardly with respect to said front frame beyond said normally open position through the pivot action of said rear temple segment with respect to said front temple segment about said second pivot axis thereby causing said spring to elastically deform within said channel and biasing said rear temple segment in the inward direction, toward said front frame.

2. The temple of claim 1 wherein said spring is a leaf spring, said leaf spring and said elongated, internal channel both being arcuately shaped, said front and rear temple segments each including an inside and outside surface, said inside surfaces facing the wearer's head upon placing the eyewear on the head.

3. The temple of claim 2 wherein said elongated, internal channel tapers gradually inwardly from said rear temple segment front end towards said rear temple segment rear end, and said leaf spring abuts said rear temple segment adjacent said outside surface of said front end of said rear temple segment.

4. The temple of claim 3 wherein a space is formed between said leaf spring second end and the end of said channel located opposite said rear temple front end when said leaf spring is unbiased, said leaf spring second end being freely movable within said channel to close said space upon said leaf spring being urged into the biased condition.

5. The temple of claim 2 wherein said pivotal connection point between said front and rear temple segments is located along said inside surfaces.

6. The temple of claim 1 wherein said spring is integrally formed with said front temple segment.

7. The temple of claim 1 wherein said spring is a cable spring.

8. The temple of claim 1 wherein said spring is a leaf spring and said rear end of said front temple segment includes first and second parallel fingers between which said first end of said leaf spring is secured.

9. The temple of claim 1 wherein said spring means is an elongated spring having first and second, opposite ends, said spring first end being secured to said rear end portion of said first temple segment adjacent said second pivot axis.

10. A temple for an eyewear having a front frame, said temple comprising:

a) a first temple segment having opposite front and rear end portions, said front end portion being pivotally connected to said front frame and thereby defining a first pivot axis;

b) a second temple segment having opposite front and rear end portions, said front end portion of said second temple segment being pivotally connected to said first temple segment adjacent said rear end portion thereof and thereby defining a second pivot axis which is substantially parallel to said first pivot axis, said first and second temple segments being movable together about said first pivot axis between a normally closed position and a normally open position with respect to said front frame; and c) spring means secured adjacent said rear end portion of said first temple segment, said spring means being operable to bias said second temple segment in a first direction upon application of a force to said second temple segment in a second direction opposite said first direction which moves said second temple segment beyond said normally open position.

11. The temple of claim 10 wherein said spring means has first and second, opposite ends, said spring first end being fixedly secured to said rear end portion of said first temple segment.

12. The temple of claim 11 wherein said spring means is integrally formed with said first temple segment.

13. The temple segment of claim 12 wherein said spring means is a single leaf spring.

14. The temple of claim 10 wherein said spring means is removably connected to said first temple segment.

15. The temple of claim 14 wherein said rear end portion of said first temple segment includes first and second, parallel prongs between which a portion of said spring means is secured.

16. The temple of claim 10 wherein said spring means is an elongated spring having first and second, opposite ends, said spring first end being secured to said rear end portion of said first temple segment, said spring second end freely extending within a channel formed in said second temple segment beginning at said front end portion thereof.

17. The temple of claim 16 wherein said channel is defined by an inner channel wall and said second temple segment has opposite inner and outer facing surfaces which lie toward and away from the head when said eyewear is worn, respectively, a first side of a portion of said spring abutting said inner channel wall adjacent said outer facing surface when in the unbiased condition.

18. The temple of claim 17 wherein a second side of said portion opposite said first side of said spring abuts said inner channel adjacent said inner facing surface of said second temple segment when said spring is in said biased condition, and thereby defining the full pivotal movement of said second temple segment with respect to said first temple segment about said second pivot axis.

19. The temple of claim 10 wherein said spring means is a cable spring.

20. The temple of claim 10 wherein said front end portion of said first temple segment forms a positive stop with said front frame to define said normally open position of said temple.

21. The temple of claim 10 and further comprising a connecting member which interconnects said front end of said first temple segment to said front frame.

* * * * *

UNITED STATES PATENT AND TRADEMARK OFFICE
CERTIFICATE OF CORRECTION

PATENT NO. : 5,666,181
DATED : September 9, 1997
INVENTOR(S) : Simon M. Conway

It is certified that error appears in the above-identified patent and that said Letters Patent is hereby corrected as shown below:

On the cover page, the filing date should be -- April 11, 1996 --.

Signed and Sealed this

Twentieth Day of June, 2000

Attest:

Q. TODD DICKINSON

*Attesting Officer*         *Director of Patents and Trademarks*